US009182104B2

(12) United States Patent
Letoumelin et al.

(10) Patent No.: US 9,182,104 B2
(45) Date of Patent: Nov. 10, 2015

(54) LIGHTING MODULE AND METHOD FOR ASSEMBLING SUCH A MODULE

(71) Applicant: Valeo Vision, Bobigny Cedex (FR)

(72) Inventors: Remi Letoumelin, Chessy (FR); Thomas Canonne, Poissy (FR)

(73) Assignee: Valeo Vision, Bobigny (FR)

( * ) Notice: Subject to any disclaimer, the term of this patent is extended or adjusted under 35 U.S.C. 154(b) by 103 days.

(21) Appl. No.: 14/153,309

(22) Filed: Jan. 13, 2014

(65) Prior Publication Data

US 2014/0198512 A1 Jul. 17, 2014

(30) Foreign Application Priority Data

Jan. 15, 2013 (FR) ..................................... 13 50333

(51) Int. Cl.

*B60Q 1/00* (2006.01)
*F21V 13/04* (2006.01)
*F21S 8/10* (2006.01)
*F21V 7/08* (2006.01)

(52) U.S. Cl.

CPC ................. *F21V 13/04* (2013.01); *F21S 48/00* (2013.01); *F21S 48/1109* (2013.01); *F21S 48/1159* (2013.01); *F21S 48/1305* (2013.01); *F21S 48/142* (2013.01); *F21S 48/145* (2013.01); *F21V 7/08* (2013.01); *Y10T 29/49826* (2015.01)

(58) Field of Classification Search

CPC ...................................................... F21S 48/145
USPC ................................................. 362/539, 487
See application file for complete search history.

(56) References Cited

U.S. PATENT DOCUMENTS

| | | | | |
|---|---|---|---|---|
| 8,287,167 | B2 | 10/2012 | Inaba | |
| 2007/0133220 | A1* | 6/2007 | Watanabe et al. | 362/538 |
| 2009/0097269 | A1* | 4/2009 | Stauss et al. | 362/539 |
| 2010/0165654 | A1* | 7/2010 | Okubo et al. | 362/539 |
| 2010/0246204 | A1 | 9/2010 | Inaba | |
| 2012/0314441 | A1* | 12/2012 | Fukawa et al. | 362/520 |

FOREIGN PATENT DOCUMENTS

| | | |
|---|---|---|
| FR | 2753148 | 3/1998 |
| FR | 2964723 | 3/2012 |
| FR | 2966221 | 4/2012 |

* cited by examiner

*Primary Examiner* — Evan Dzierzynski
(74) *Attorney, Agent, or Firm* — Jacox, Meckstroth & Jenkins

(57) ABSTRACT

A lighting module comprising an elliptical collector for reflecting in the direction of an optical element a beam originating from a light source. The module comprises a screen assembled along the path of the light beam so as to form a cutoff edge. In accordance with the invention, the light source, the elliptical collector and the screen are assembled on an active surface of a support, which additionally comprises a referencing wall. Means for pressing the screen against said active surface and for pushing the front face of the screen, which comprises the cutoff edge, against said referencing wall are provided.

21 Claims, 3 Drawing Sheets

LIGHTING MODULE AND METHOD FOR ASSEMBLING SUCH A MODULE

CROSS-REFERENCE TO RELATED APPLICATIONS

This application claims priority to French Application No. 1350333 filed Jan. 15, 2013.

BACKGROUND OF THE INVENTION

1. Field of the Invention

The present invention relates generally to motor vehicle headlamps. The invention more specifically relates to an illumination module with which these headlamps can be equipped and which comprises a light source, an elliptical collector which allows the reflection of a beam originating from this source, and a convergent lens in the direction of which the beam is reflected so as to be distributed and projected externally of the headlamp, in front of the vehicle. The light source is disposed substantially in line with the first focal point of the collector.

2. Description of the Related Art

Such modules comprising a light source, a collector and a convergent lens are known, in which, in order to meet standards aimed for example at preventing road users coming from the opposite direction from being dazzled, an lighting beam of the cutoff type is produced. A cutoff beam means a lighting beam which has a directional limit, that is to say the cutoff, beyond which the luminous intensity is reduced. To this end, these modules are equipped with a shield, which is disposed along the path of the light beam, substantially in line with the second focal point of the collector, so as to cut off the potentially dazzling part of the beam. It is therefore necessary to precisely position close to the second focal point the edge of the shield that will delimit the cutoff of the beam, this edge being referred to as the cutoff edge.

Conventionally, such a shield is placed in position in the module by the cooperation of indexing holes formed in the shield and indexing pieces interdependent with a component of the module and is fixed in place by screwing. It is therefore necessary during manufacture of the shield to ensure very precise positioning of the indexing holes in relation to the cutoff edge. In addition, the assembly play which arises with this type of assembly may hinder the precise positioning of the cutoff edge of the shield in the module. This results in a less precise cutting of the light beam exiting from the module. This impaired positioning hinders chromatism, inter alia.

SUMMARY OF THE INVENTION

The present invention specifies a lighting module in which the shield and the module in which the shield is inserted have structures suitable for the most precise assembly possible.

In accordance with a particularly advantageous feature of the invention, the light source, the collector and the shield are assembled on an active surface of a support. This support comprises a referencing wall that protrudes from the active surface and is used as a reference tool for the positioning of the shield when it is attempted to place the shield very precisely in relation to the second focal point of the collector in the vicinity. The module also comprises means for pressing the shield against the support, the means for pushing the front face of the shield, which comprises the cutoff edge, against the referencing wall.

In this way, the position of the shield is adjusted by the pressing of one of its faces against an element of the support.

Arrangements of the prior art in which the shield is positioned by the cooperation between holes formed in the thickness of the shield and pieces originating either from the support or from the collector are thus avoided, and the machining operations carried out on the shield are thus limited. Manufacturing tolerances, which must be observed so that the adjustment is as reliable as possible, are limited. Advantageously, it is sufficient here to focus on the straightness of the front face of the shield since this performs the dual function of cutting the beam and providing an indexing means in relation to the support and therefore in relation to the collector, which is also connected to the support.

In accordance with a further feature of the invention, the front face of the shield comprises a bearing zone for coming into contact with the referencing wall under the action of the pushing of the pressing means and also comprises a separate zone carrying the cutoff edge. The shield can thus be pressed against the referencing wall with the same face as that comprising the cutoff edge without hindering the cutting of the light beam.

In a specific embodiment of the invention, the shield has a beam-blocking part and an actuating part, which may both be hinged in relation to one another by means of a transverse folding line formed on a lower face of the shield. The blocking part is substantially planar and is to be pressed against the active surface of the support by inner ribs of the collector. The actuating part rests on means forming a ramp, said means being interdependent with the support, so as to promote the sliding of the shield along the active surface of the support toward the referencing wall.

The means forming a ramp are thus inclined in relation to the normal to the active surface and are oriented toward the referencing wall. The shield thus slides toward the referencing wall and it is ensured that the front face, opposite the actuating part, is well pressed against the referencing wall.

In accordance with features that are found in a preferred embodiment of the invention, the means forming a ramp are formed by two ramps which protrude at a transverse distance from one another from the support, and at the same time the shield has the form of a plate equipped with two tabs which extend the shield opposite its front face, each tab being adapted to cooperate with one of the ramps.

These ramps may comprise end walls protruding from the slope, which act as a stop for the tabs of the shield.

The support comprises a rib, which protrudes transversely between the two ramps and on which the shield rests so as to prevent the passage of a light beam between the shield and the support.

In accordance with a feature of the invention, the shield comprises a reflective face, which faces away from the active surface of the support. The light beam may thus be reflected totally on this face of the shield. It is on the face opposite this reflective face that the folding line is formed.

In accordance with an advantageous feature of the invention, the referencing wall of the support serves as a reference point common to the shield and to the collector.

The module, in a complementary manner, may thus comprise second pressing means for forcing the collector into axial displacement against the referencing wall of the support. These second pressing means may consist of a protuberance interdependent with the collector and able to deform against a wall of the support by opposing a force in response, which generates the displacement of the collector with respect to the wall, in the direction of the referencing wall. This protuberance will be dimensioned so as not to create excessive deformations of the collector during assembly thereof.

The module may also comprise means for guiding the collector in relation to the support.

In accordance with a feature of the invention, the shield has an axial position. The active surface of the support is arranged such that the shield is disposed in the focal plane passing through the two focal points when it is pressed against the active surface.

In accordance with variants, the optical element may be a convergent lens or a complementary reflector, for example of parabolic form, extending the reflection of the light.

The invention also seeks to protect a method for assembling a lighting module. In this method, the light source is first fixed on the active surface of the support, then the shield is placed on the active surface, on the one hand by positioning the front face of the shield against the referencing wall and on the other hand by placing the opposite part of the shield on the means forming a ramp, which protrude from the support. The shield is thus inclined in relation to the active surface. The collector is then connected to the active surface of the support by cooperating on the one hand complementary guiding means for the transverse guidance of the collector in relation to the support and on the other hand second pressing means for pushing the collector against the referencing wall of the support. In this way, by means of the collector, the shield is deformed such that the blocking part is pressed against the active surface by inner ribs of the collector and the actuating part is pressed against the means forming a ramp. The inclined form of the means forming a ramp on which the actuating part rests generates the pressing of the shield against the referencing wall. It thus remains to screw the collector to the support when the collector is in abutment, thus trapping the shield between the inner ribs of the collector and the active surface of the support.

These and other objects and advantages of the invention will be apparent from the following description, the accompanying drawings and the appended claims.

Further features and advantages of the invention will emerge from reading the following description with reference to the figures below, in which:

BRIEF DESCRIPTION OF THE ACCOMPANYING DRAWINGS

FIG. 1 schematically illustrates an illumination module in which a light-emitting diode and the light beam emitted by this diode, reflected successively by a collector, a shield, and a convergent lens can be seen in particular;

FIG. 1*a* shows details of the lighting module of FIG. 1 in order to illustrate the principle of reflection of the light beam in the lighting module according to the invention;

DETAILED DESCRIPTION OF THE PREFERRED EMBODIMENTS

Figure 1:
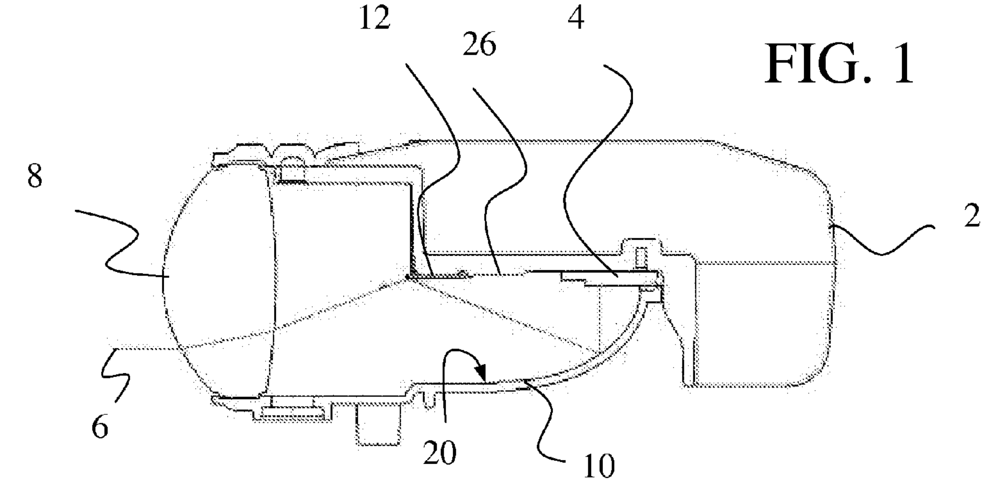

An lighting module has been shown in FIG. 1. In accordance with the invention, this module comprises a support 2, which is adjoined by a light source 4 emitting a light beam 6, an optical element 8 for diffusing outside the module the light reflected in the module, and an elliptical collector 10 for reflecting the light beam 6 in the direction of the optical element 8, as well as a shield 12 disposed along the path of the light beam 6 such that the light beam 6 is cut and the light exiting from the module meets legislative standards concerning certain driving conditions. An embodiment of these components will be detailed hereinafter, in particular on the basis of FIGS. 2 to 6, and components of this lighting module acting over the trajectory of the light beam 6 have also been shown in FIG. 1*a*.

Figure 5:
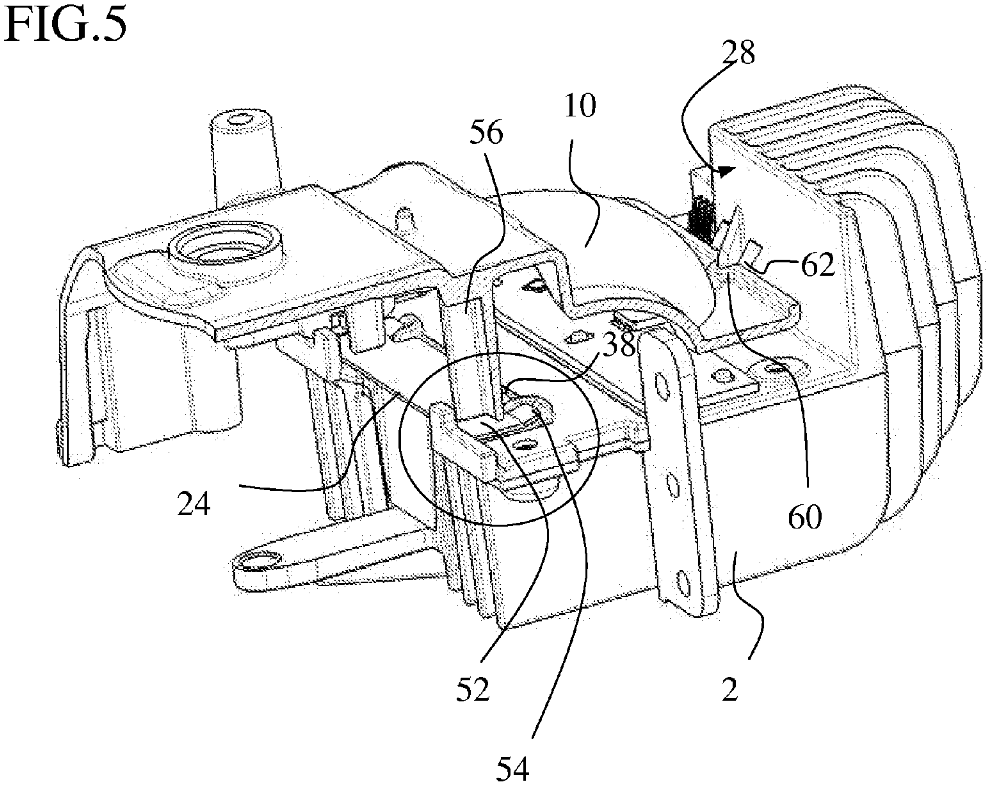
FIG. 5 is a perspective view similar to FIG. 3, illustrating a second step of assembly of the lighting module, in which the collector is connected to the support by resting on the shield.
Figure 6:
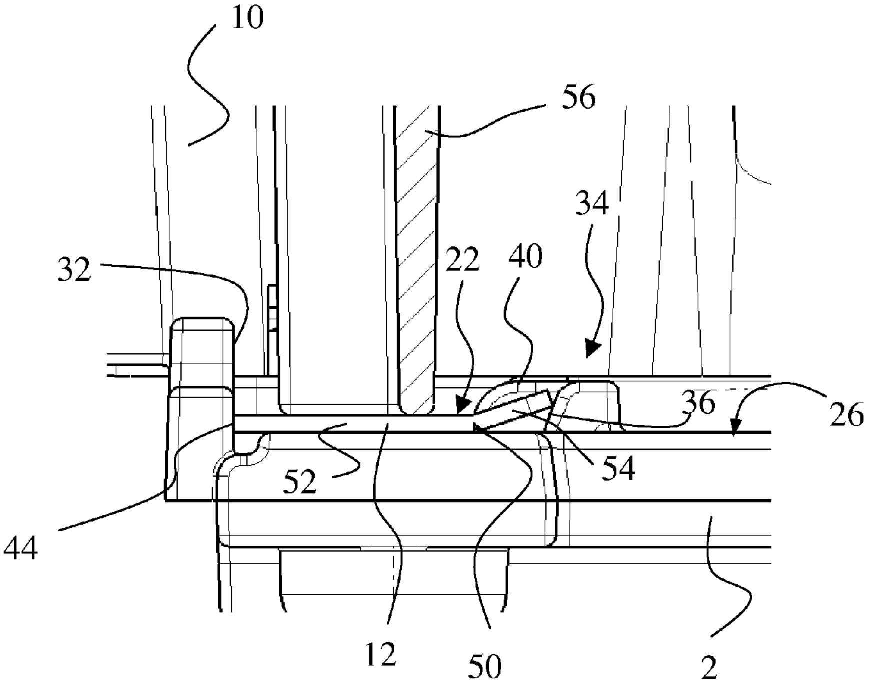
FIG. 6 is a view similar to FIG. 4, in which the shield is definitively placed in position by assembly of the collector against the support.

The elliptical collector 10, which is visible in particular in FIG. 1 and in part in FIG. 5, is of the elliptical type. It has two focal points 14 and 16, an optical axis 18, and a substantially elliptical reflective surface 20.

The substantially elliptical reflective surface 20 is formed in the manner of an angular sector of a substantially rotationally symmetrical part and extends in the half space located above an axial plane perpendicular to the plane of the drawing and containing the optical axis 18. However, it can be noted that the substantially elliptical reflective surface 20 may not be perfectly elliptical and may have a number of specific profiles provided so as to optimize the luminous distribution in the light beam 6 produced by the module. This implies that the elliptical collector 10 is not perfectly rotationally symmetrical.

The light source 4 is arranged close to the first focal point 14 of the elliptical collector 10. Advantageously, the light source 4 is a light-emitting diode which emits the majority of its luminous energy toward the inner reflective face of the substantially elliptical reflective surface 20.

The optical element 8 has a focal point that is substantially combined with the second focal point 16 of the elliptical collector 10, this arrangement enabling the majority of the rays emitted by the light source 4 and passing through the second focal point 16 of the elliptical collector 10 to be reflected by the optical element 8 in accordance with the direction of lighting corresponding to its optical axis 18.

It will be understood that these figures illustrate a specific embodiment in that the optical element 8 for diffusing the light beam 6 exiting from the module is a convergent lens here. Without departing from the context of the invention, other optical elements can be provided, for example a parabolic reflector placed at the second focal point 16 as is described in patent application FR 2 966 221.

The shield 12 is located between the elliptical collector 10 and the optical element 8 and comprises at least one upper reflective face 22 and a front end edge referred to as a cutoff edge 24. The cutoff edge 24 is arranged close to the second focal point 16 of the elliptical collector 10.

Figure 1A:
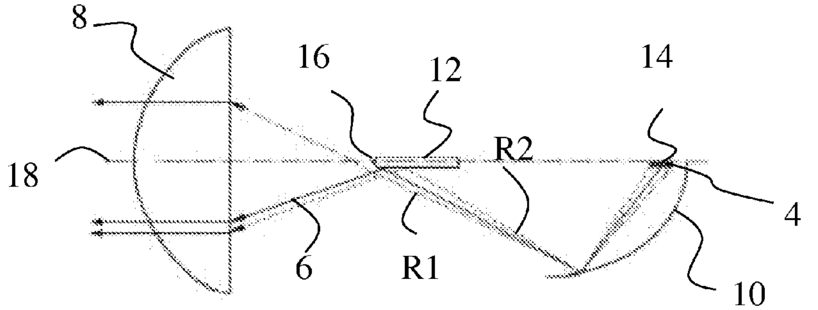

The operating principle of the lighting module is as follows: since the light source 4 is arranged at the first focal point 14 of the elliptical collector 10, the majority of the rays emitted by the light source 4, represented by solid lines in FIG. 1*a*, after being reflected on the inner face of the elliptical collector 10, are returned toward the second focal point 16 or close thereto. They then pass through the lens (or are reflected on a complementary reflector) and exit from the lighting module in a direction substantially parallel to the optical axis 18.

However, if the use of a diode makes it possible to focus the light emission, rays at the periphery of the light source 4 may be emitted. Some rays (such as the ray R1 visible in FIG. 1*a*), after being reflected on the inner face of the elliptical collector 10, may thus go beyond the cutoff edge 24. The role of the shield 12 is to limit the number of these rays R! going beyond the cutoff edge 24. Thus, some of the peripheral rays (such as the ray R2 visible in FIG. 1*a*), after having been reflected on the inner face of the elliptical collector 10, may also be reflected on the substantially elliptical reflective surface 20 of the shield 12 before passing through the optical element 8. The ray R2 is thus emitted below the cutoff edge 24 in the light beam 6. Without the reflection of R2 on the shield 12, the ray R2 would not have been exploited.

The elements forming the lighting module according to the invention, in which the light source 4, the elliptical collector 10 and the shield 12 are assembled on a support 2, will now be described in greater detail.

The support 2 comprises a substantially planar active surface 26 (FIG. 3) and a rear wall 28, which perpendicularly extends the active surface 26 at its rear end.

The rear wall 28 carries a rib 30, which protrudes from the rear wall 28. As will be described hereinafter, this rib 30 cooperates with a groove in the elliptical collector 10 so as to form guiding and positioning means.

The support 2 further comprises a referencing wall 32, which perpendicularly prolongs the front end of the active surface 26, opposite the rear wall 28, as well as means 34 forming a ramp. The referencing wall 32 is interrupted here in its central part so as to be flush with the active surface 26.

The means 34 forming ramps, in the illustrated embodiment, comprise two ramps 36, each being inclined in relation to the normal to the active surface 26 so as to be oriented toward the referencing wall 32. The ramps 36 are distanced from one another transversely, and a rib 38 (visible in FIG. 5) protrudes from the active surface 26, transversely between the two ramps 36. The ramps 36 are bordered by upright walls 40.

Figure 3:
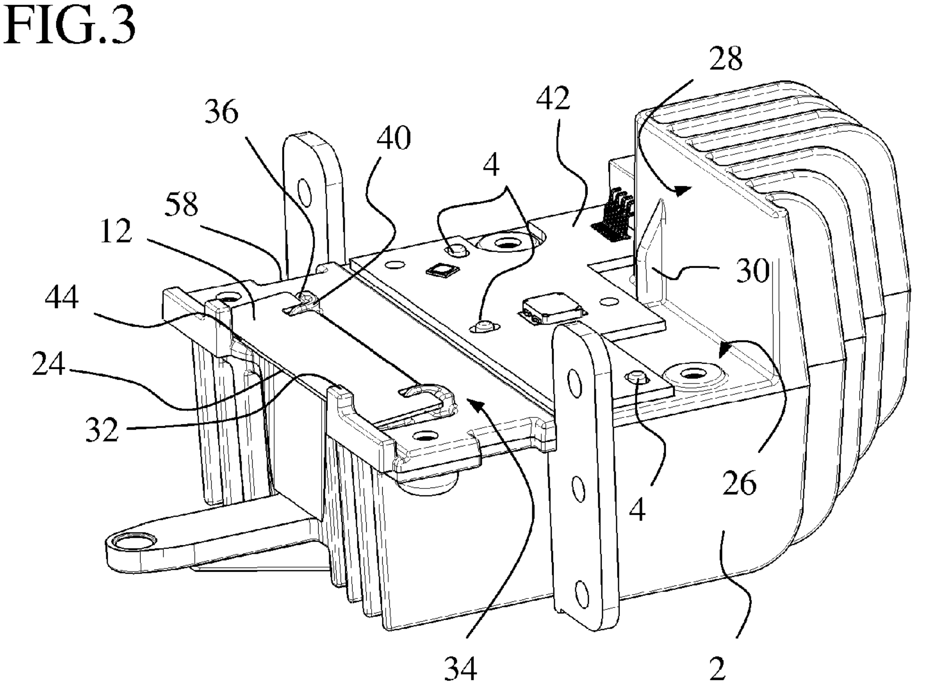
FIG. 3 illustrates a first step of assembly of the lighting module, with the shield disposed on a support.
Figure 4:
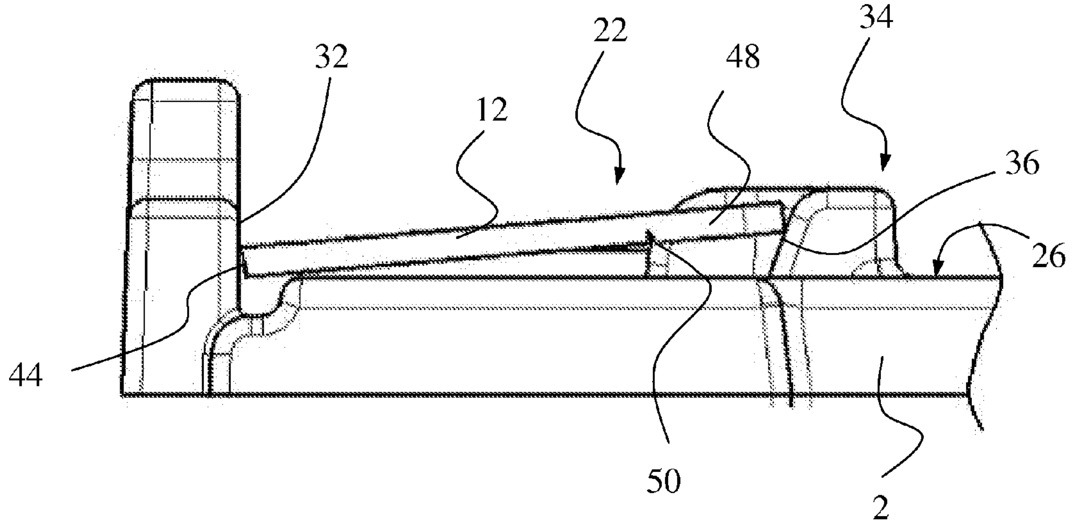
FIG. 4 is a detailed view of FIG. 3, as viewed from the side.

The planar active surface 26 receives the light source 4, formed for example by one or more light-emitting diodes. As illustrated in FIG. 3, three diodes are disposed against the active surface 26, with a support plate 42, which also carries means for supplying power to these diodes and which is made integral with the active surface 26. The diodes are arranged so as to be located in the focal zone of the first focal point 14 of the elliptical collector 10.

The shield 12 is assembled on the active surface 26 of the support 2, along the path of the light beam 6.

Figure 2:
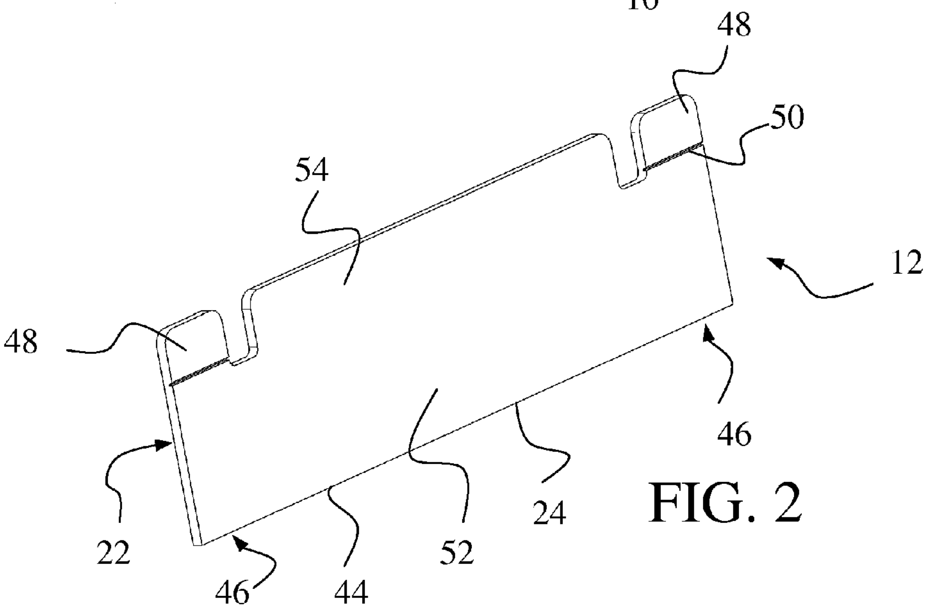
FIG. 2 illustrates the shield according to the invention.

As illustrated in FIG. 2, the shield 12 according to the invention has the form of a rectangular plate. The front face 44 of the shield 12 comprises a bearing zone 46 for coming into contact with the referencing wall 32 under the action of the pushing of the pressing means and also comprises a separate zone carrying the cutoff edge 24. This cutoff edge 24 is arranged close to the second focal point 16 of the elliptical collector 10 so as to form a cutoff point in the light beam 6, as has been described previously.

Here, the shield 12 is formed with a reflective face 22. It is cut out from a sheet of aluminum and has two notches on its rear face, each formed at an equal distance from their corresponding lateral face so as to form two tabs 48. A transverse folding line 50 is formed transversely in the shield 12 at the base of these tabs 48. This folding line 50 is formed on the face opposite the reflective face 22.

The shield 12 thus has the form of a plate equipped with two tabs 48 which extend the shield 12 opposite its front face, each tab 48 cooperating with one of the ramps 36 formed integrally with the support 2.

Functionally, it is understood that the shield 12 on the one hand has a substantially planar beam-blocking part 52 for being pressed against the active surface 26 of the support 2 and for reflecting the light beam 6 and on the other hand has an actuating part 54 formed by the two tabs 48, which cooperates with the means 34 forming a ramp 36 and which is hinged in relation to the blocking part 52 via the transverse folding line 50.

It is understandable that the actuating part 54 may take a different form, without a folding line 50. Resilient biasing means that force the shield 12 to press against the referencing wall 32 without the actuating part 54 being hinged in relation to the blocking part 52, the biasing component thus being essentially longitudinal, are possible.

In the illustrated example, the actuating part 54 rests on the means 34 forming a ramp 36, the means 34 being integral with the support 2. The inclination of these means 34 forming ramps 36 promotes the sliding of the shield 12 along the active surface 26 of the support 2 toward the referencing wall 32.

By way of example, an angle of 30° could be provided between the plane which is parallel to the referencing wall 32 and perpendicular to the active surface 26 and the plane defining the inclination of the means 34 forming a ramp 36.

The active surface 26 of the support 2 is arranged in such a way that the shield 12, when it is pressed against the active surface 26, is disposed in the focal plane passing through the two focal points 14 and 16.

As is visible in FIG. 1, the elliptical collector 10 is connected to the support 2. Its role is to ensure the reflection of the light beam 6, to enable the fixation of the optical element 8, and also to contribute to the locking in position of the shield 12 in relation to the support 2.

The elliptical collector 10 here comprises inner ribs 56, which extend substantially over the entire height of the elliptical collector 10 so as to be located close to the active surface 26, thus trapping the shield 12 when the elliptical collector 10 is connected to the support 2.

The elliptical collector 10 also comprises guiding means, which adopt a form for cooperating with complementary shapes formed on the support 2. Guiding lugs (not shown in the figures to improve the overview of the assembly), which are to be inserted into indexing holes 58 in the support 2, could thus be provided, or else a groove 60 formed on the rear face of the elliptical collector 10, the groove 60 facing the rear wall 28 of the support 2 and cooperating with the rib 30 that comprises the rear wall 28. These guiding means ensure both the transverse guidance and the axial guidance of the elliptical collector 10 in relation to the support 2.

The elliptical collector 10 further comprises protuberances 62 disposed on its rear face and turned away from the front end of the elliptical collector 10. These protuberances 62 and the wall against which they act form second pressing means for forcing the elliptical collector 10 into axial displacement against the referencing wall 32 of the support 2.

The method for assembling a lighting module as has just been described will now be described. According to the invention, the referencing wall 32 of the support 2 acts as a reference point common to the shield 12 and to the elliptical collector 10. The ramps 36 form part of means for pressing the shield 12 against the active surface 26 of the support 2, pushing the front face 44 of the shield 12, which comprises the cutoff edge 24, against the referencing wall 32.

In a first step, the light source 4 is fixed on the active surface 26 of the support 2. The shield 12 is also placed on the active surface 26 by positioning the front face 44 of the shield 12 against the referencing wall 32 and by placing the opposite part of the shield 12 on means 34 forming a ramp 36, which protrude from the support 2. Without restriction of the shield 12, this keeps its planar form, such that it is inclined in relation to the active surface 26. The shield 12 is held in this initial position, laterally by the cooperation of the notches and of the tabs 48 with the ramps 36, and longitudinally by the abutment of the free end of the tab 48 against a wall of the ramp 36 on one side, and by the abutment of the active surface 26 of the shield 12 against the referencing wall 32 formed integrally with the support 2.

The elliptical collector 10 is connected to the active surface 26 of the support 2 by cooperating the complementary guiding means of the elliptical collector 10 and of the support 2, equally for the transverse guidance and for the axial guidance of the elliptical collector 10. The guide lugs (not shown) of the elliptical collector 10 are inserted into the indexing holes 58 in the support 2, and the rear face of the elliptical collector 10 descends along the rear wall 28 of the support 2.

The shield 12 is deformed by the displacement of the elliptical collector 10 perpendicularly to the active surface 26 of the support 2, such that a first part of the shield 12, referred to as a blocking part 52, is pressed against the active surface 26 by the inner ribs 56 of the elliptical collector 10 whereas the second part of the shield 12, referred to as an actuating part 54, remains pressed against the means 34 forming a ramp 36. By pressing the elliptical collector 10 on the support 2, the inner ribs 56 bear on the shield 12 and press it against the support 2. The shield 12 being positioned with its folding line 50 facing the support 2, the pressing of the shield 12 against the support 2 forces the shield 12 to fold at the folding line 50, the tabs 48 remaining in abutment on the ramps 36 whereas the shield 12 now finds itself held flat, pressed between the support 2 and the stiffening inner ribs 56 of the elliptical collector 10.

During this positioning of the shield 12, the slope of the ramps 36 drives a sliding of the tab 48 downwards, in the direction of the active surface 26 of the support 2, and this generates a displacement of the shield 12 against the referencing wall 32 of the support 2. It is thus ensured that the cutoff edge 24 of the shield 12, disposed at the opposite end of the tabs 48, is correctly positioned against the referencing wall 32. The shield 12 is thus pressed against the referencing wall 32 by sliding the second part against the means 34 forming a ramp 36 under the action of the displacement of the elliptical collector 10.

It is noted that, in this pressed position of the shield 12, the shield 12 rests on the inner rib 56 so as to prevent the passage of a light beam 6 between the shield 12 and the support 2.

The referencing wall 32 of the support 2 is also used to fix the position of the elliptical collector 10. In this respect, the elliptical collector 10 comprises flexible elements for cooperating with one of the walls of the support 2 disposed parallel to the referencing wall 32.

The protuberance interdependent with the elliptical collector 10 can deform against the rear wall 28 of the support 2 by opposing a force in response, which generates the displacement of the elliptical collector 10 opposite the rear wall 28, in the direction of the referencing wall 32.

Lastly, the elliptical collector 10 is screwed to the support 2 when the elliptical collector 10 is in abutment by thus trapping the shield 12 between the inner ribs 56 of the elliptical collector 10 and the active surface 26 of the support 2. It is thus ensured that the shield 12 does not move when the elliptical collector 10 has just been assembled on the support 2.

Upon reading the foregoing, it is clear that the invention effectively achieves the objectives on which it is based, which need not be repeated in full. The position of the cutoff edge 24 in relation to the elliptical collector 10 is ensured in such a way that the positioning play mentioned previously in the prior art constructions is eliminated. The cutoff edge 24 is placed correctly in the focal plane of the lens, and the light beam 6 originating from the light-emitting diodes in the lighting module can be cut off correctly.

Advantageously, the different elements of the lighting module are assembled correctly, without play, the parts being pressed naturally on the reference surface. It is not necessary to produce positioning holes on the shield 12, such that the shield 12 requires simplified manufacture. The face of the shield 12 carrying the cutoff edge 24 being used to fix the part in position, only the linearity of the part is a source of dispersion.

Lastly, the referencing wall 32 being used for the positioning of the shield 12 and of the elliptical collector 10, the position of the shield 12 in relation to this elliptical collector 10 is independent of manufacturing play of the support 2.

However, the invention is not limited only to devices conforming to the embodiment explicitly described with respect to FIGS. 1 to 6, nor merely to a determined application. Without departing from the scope of the invention, the device can be applied, for example for motor vehicles, equally to lighting devices as to signaling devices and can also be applied to interior or exterior lighting devices.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A lighting module comprising an elliptical collector for reflecting in the direction of an optical element a light beam originating from a light source arranged close to a first focal point of said elliptical collector, and further comprising a shield assembled along the path of said light beam and of which an edge, referred to as a cutoff edge, is arranged close to a second focal point of said elliptical collector so as to form a cutoff in said light beam, wherein said light source, said elliptical collector and said shield are assembled on an active surface of a support, which comprises a referencing wall that protrudes from said active surface as well as means for pressing said shield against said active surface of said support, means for pushing a front face of said shield, which comprises said cutoff edge, against said referencing wall.

2. The lighting module according to claim 1, wherein said front face of said shield comprises a bearing zone for coming into contact with said referencing wall under the action of the pushing of said means for pressing and also comprises a separate zone carrying said cutoff edge.

3. The lighting module according to claim 2, wherein said shield has a substantially planar beam-blocking part adapted to be pressed against said active surface of said support by inner ribs of said elliptical collector as well as an actuating part for resting on means forming a ramp, said means being interdependent with said support and promoting the sliding of said shield along said active surface of said support toward said referencing wall.

4. The lighting module according to claim 2, wherein said referencing wall of said support serves as a reference common to said shield and to said elliptical collector.

5. The lighting module according to claim 1, wherein said shield has a substantially planar beam-blocking part adapted to be pressed against said active surface of said support by inner ribs of said elliptical collector as well as an actuating part for resting on means forming a ramp, said means being interdependent with said support and promoting the sliding of said shield along said active surface of said support toward said referencing wall.

6. The lighting module according to claim 5, wherein said actuating part is hinged in relation to said substantially planar beam-blocking part by a transverse folding line formed on a face of said shield.

7. The lighting module according to claim 6, wherein said shield comprises a reflective face on which said transverse folding line is formed, said reflective face facing away from said active surface of said support.

8. The lighting module according to claim 6, wherein said means forming a ramp are inclined in relation to the normal to said active surface and are oriented toward said referencing wall.

9. The lighting module according to claim 5, wherein said means forming a ramp are inclined in relation to the normal to said active surface and are oriented toward said referencing wall.

10. The lighting module according to claim 5, wherein said means forming said ramp of said support comprise two ramps, and in that said shield has the form of a plate equipped with two tabs, which form said actuating part and which extend said shield opposite its front face, each tab being adapted to cooperate with one of said ramps.

11. The lighting module according to claim 10, wherein said ramps comprise upright walls, which act as a stop for said two tabs of said shield.

12. The lighting module according to claim 10, wherein said support comprises a rib, which protrudes transversely between said two ramps and on which said shield rests so as to prevent the passage of said light beam between said shield and said support.

13. The lighting module according to claim 1, wherein said referencing wall of said support serves as a reference common to said shield and to said elliptical collector.

14. The lighting module according to claim 13, wherein said lighting module comprises a second pressing means for forcing said elliptical collector into axial displacement against said referencing wall of said support.

15. The lighting module according to claim 14, wherein said second pressing means consist of a protuberance interdependent with said elliptical collector and able to deform against a wall of said support by opposing a force in response, which generates the displacement of said elliptical collector with respect to said wall, in the direction of said referencing wall.

16. The lighting module according to claim 1, wherein said lighting module comprises means for guiding said elliptical collector in relation to said support.

17. The lighting module according to claim 1, wherein said active surface of said support is arranged such that said shield is disposed in a focal plane passing through two focal points when it is pressed against said active surface.

18. The lighting module according to claim 1, wherein said light source is a light-emitting diode.

19. The lighting module according to claim 1, wherein said optical element is a convergent lens.

20. A method for assembling a lighting module according to claim 1, wherein:

said light source is fixed on said active surface of said support;

said shield is placed on said active surface by positioning said front face of said shield against said referencing wall and by placing the opposite part of said shield on said means forming a ramp, which protrude from said support, such that said shield is inclined in relation to said active surface;

said elliptical collector is connected to said active surface of said support by cooperating on the one hand complementary guiding means for the transverse guidance of said elliptical collector in relation to said support and on the other hand second pressing means for pushing said elliptical collector against said referencing wall of said support;

said shield is deformed by the displacement of said elliptical collector perpendicularly to said active surface of said support, such that a first part of said shield, referred to as a blocking part, is pressed against said active surface by inner ribs of said elliptical collector and a second part of said shield, referred to as an actuating part, is pressed against said means forming a ramp;

said shield is pressed against said referencing wall by sliding said second part against said means forming a ramp, under the action of the displacement of said elliptical collector; and said elliptical collector is screwed to said support when said elliptical collector is in abutment, thus trapping said shield between said inner ribs of said elliptical collector and said active surface of said support.

21. An interior or exterior signaling and/or lighting device for a motor vehicle, wherein said signaling and/or lighting device comprises a lighting module according to claim 1.

* * * * *